United States Patent
Seo et al.

(10) Patent No.: US 8,452,740 B2
(45) Date of Patent: May 28, 2013

(54) METHOD AND SYSTEM FOR SECURITY OF FILE INPUT AND OUTPUT OF APPLICATION PROGRAMS

(75) Inventors: Yang Jin Seo, Seoul (KR); Sang Hak Nah, Seoul (KR); Jin Young Jung, Yongin-si (KR)

(73) Assignee: Softcamp Co., Ltd., Seoul (KR)

( * ) Notice: Subject to any disclaimer, the term of this patent is extended or adjusted under 35 U.S.C. 154(b) by 64 days.

(21) Appl. No.: 13/048,265

(22) Filed: Mar. 15, 2011

(65) Prior Publication Data
US 2011/0231378 A1      Sep. 22, 2011

(30) Foreign Application Priority Data

Mar. 16, 2010   (KR) ................. 10-2010-0023215

(51) Int. Cl.
*G06F 7/00* (2006.01)
(52) U.S. Cl.
USPC ................... 707/694; 726/27; 726/1
(58) Field of Classification Search
USPC ....................... 707/694; 726/1, 27
See application file for complete search history.

(56) References Cited

U.S. PATENT DOCUMENTS

| | | | | |
|---|---|---|---|---|
| 7,484,245 | B1 * | 1/2009 | Friedman et al. | 726/27 |
| 8,161,014 | B1 * | 4/2012 | Allen | 707/694 |
| 2002/0178271 | A1 * | 11/2002 | Graham et al. | 709/229 |
| 2003/0105734 | A1 * | 6/2003 | Hitchen et al. | 707/1 |
| 2004/0225524 | A1 * | 11/2004 | Narasimhan et al. | 705/1 |
| 2005/0076061 | A1 * | 4/2005 | Cox | 707/104.1 |
| 2008/0189794 | A1 * | 8/2008 | Staring et al. | 726/27 |
| 2009/0055918 | A1 * | 2/2009 | Chang et al. | 726/10 |
| 2009/0300712 | A1 * | 12/2009 | Kaufmann et al. | 726/1 |
| 2010/0146600 | A1 * | 6/2010 | Eldar et al. | 726/5 |

* cited by examiner

*Primary Examiner* — Pierre Vital
*Assistant Examiner* — Christopher J Raab
(74) *Attorney, Agent, or Firm* — IPLA P.A.; James E. Bame

(57) ABSTRACT

Provided herein is a method and system for the security of the file input and output of application programs. At a security process running step, an application program and an security process are executed independent of a main process of the application program. The security process is connected to a filter driver to control the filter driver. At an event generation step, the filter driver checks an event being processed by the application program, stops the processing of the event, and transfers event information regarding the event to the security process. At a control policy checking step, the security process compares the event information with a corresponding security control policy, and transfers the determination of the comparison to the filter driver. At an execution step, the filter driver continues the following processing of the corresponding event in conformity with the determination of the security process.

2 Claims, 4 Drawing Sheets

METHOD AND SYSTEM FOR SECURITY OF FILE INPUT AND OUTPUT OF APPLICATION PROGRAMS

CROSS REFERENCE

This application claims foreign priority under Paris Convention to Korean Patent Application No. 10-2010-0023215 filed on 16 Mar. 2010, with the Korean Intellectual Property Office, where the entire contents are incorporated herein by reference.

BACKGROUND OF THE INVENTION

1. Field of the Invention

The present invention relates to a method and system for the security of the file input and output of application programs, in which the execution paths and formats of security control policies for the input and output of files stored in a storage medium are arranged to execute data or application programs, stored in a computer, in a secure environment, so that security control policies are enabled to be easily produced and updated.

2. Description of the Related Art

As is well known, there are a variety of types of digital content, such as text, graphic, and multimedia. Various methods are used to store, represent and distribute such types of digital content.

Here, the term "digital content security" refers to the implementation of the security of authentication /authorization/management regarding the distribution/representation/storage of various types of digital content.

Of the technologies available for implementing the protection of digital content, Digital Rights Management (DRM) is a system technology which is configured to safely transfer a variety of types of digital content from a Content Provider (CP) to customers and prevent customers from illegally distributing content.

The term "document security" which is directed to the protection of digital content collectively refers to a security solution that is configured to protect core information in corporations in corporate environments, to enable confidential information to be safely transferred to the outside, and to prevent illegitimate leakage. That is, it refers to a solution enabling the creation, storage and the internal distribution of important documents and the transfer of the documents to the outside to be systematically managed using integrated security policies, and includes a mixture of various components, such as device control, printer control, authentication and server technologies. Of these components of such document security, a method for preventing data from being illegitimately moved from a storage device by controlling the input and output of the data is referred to as file input and output security.

Meanwhile, in order to implement the security of file input and output, it is necessary to predict various situations of the hacking and leakages of data or a security target application program in advance and establish security control policies capable of immediately dealing with the corresponding situations. That is, for such a security program to effectively protect protection target data or a protection target application program, a developer predicts various hacking and data leakage situations and stores them in a database (DB) or source code (hereinafter collectively referred to as a "DB") in the form of security control policies, and then data security processing is performed in compliance with the security control policies when hacking and an attempt to leak data is detected.

As a result, the superiority of a file input and output security program is dependent on the number of hacking and leakage situations which have been predicted for data stored in the same environment and the quality of security control policies which have been established to prepare for the situations. Although the security method of security programs is not limited to a method using security control policies, it is apparent that this method is a basic data security method.

In greater detail, as shown in FIG. 1 (a block diagram schematically showing the process handling of a conventional security program), when a security program is installed in a computer, a user-level access control engine 113 and a kernel-level access control engine 210 are formed at a user level 100 and a kernel level 200, respectively. In this case, the security program may apply a control module 112 and the user-level access control engine 113 to a security target application program 110, and may not apply the corresponding control module 112 and the user-level access control engine 113 to a non-security target application program 120.

For reference, the user-level access control engine 113 controls the operation of the main process 111 of the security target application program 110, and the kernel-level access control engine 210 controls the operation of a sub-process (not shown) created by the main process 111. Here, the control of the operation of the sub-process of the main process 111 means the control of the reading/access/editing/movement/deletion of data and other data processing which is performed by the main process 111 and the sub-process in compliance with security control policies stored in the DB.

Meanwhile, the user-level access control engine 113 may be configured in the form of a dynamic linking library (DLL) set in the path of a corresponding process, and the kernel-level access control engine 210 may be constructed in the form of a driver. Accordingly, when an attempt to execute a function so as to process specific data is made, the user-level access control engine 113 may block the execution of the function itself in compliance with its own control policies, with the result that a corresponding process may not perform the following procedure when a user requests a task that violates the control policies.

Thereafter, the control module 112 performs the processing of information and data based on information about control target processes and the control policies regarding the copying and pasting of various types of data. The control module 112 is an essential component of a common security program, and may be constructed in the form of a DLL.

As described above, the conventional security program is configured such that the control module 112, the user-level access control engine 113 and the kernel-level access control engine 210 which are linked to the security target application program 110 are created or installed at the user level 100 or the kernel level 200, data related to the security target application program 110 is processed in response to a command input by a user through input means (not shown), and the user-level access control engine 113 and the kernel-level access control engine 210 processes the data in a safe security environment in compliance with the set security control policies.

Meanwhile, in order to execute data or a security program in a stable security environment, the conventional security program requires that many security control policies are stored in a DB and the user-level access control engine 113 and the kernel-level access control engine 210 run in compliance with the stored security control policies. Furthermore, the security program should be installed such that the control module 112, the user-level access control engine 113 and the kernel-level access control engine 210 are applied only to the security target application program 110.

As a result, the conventional security program entails the structural complication and difficulty of production so as to fulfill the above-described conditions. Meanwhile, in order to enhance security, many security control policies should be presented and old security control policies should be updated. These security control policies should be produced using different formats and execution paths for the user level 100, the kernel level 200, the security target application program 110 and the non-security target application program 120, so that the security control policies are not easy to produce and apply.

Furthermore, in order to develop such security control policies, professional personnel should be used to handle the security target application program 110 and a long developing time is required, so that the production and maintenance of a conventional security program are problematic in that excessive costs and efforts are required.

SUMMARY OF THE INVENTION

Accordingly, the present invention has been made keeping in mind the above problems occurring in the prior art, and an object of the present invention is to provide a method and system for the security of the file input and output of application programs, which enables the security control policies of a security program for enabling a security target application program to be executed in a safe security environment to be easily developed and updated, and which enables stable execution to be achieved in various running conditions and environments.

In order to accomplish the above object, the present invention provides a method for the security of the file input and output of application programs, including a security process running step of executing an application program and an security process independent of the main process of the application program, wherein the security process is connected to a filter driver to control the filter driver; an event generation step of the filter driver checking an event being processed by the application program, stopping the processing of the event and transferring event information regarding the event to the security process; a control policy checking step of the security process comparing the event information with a corresponding security control policy and transferring the determination of the comparison to the filter driver; and an execution step of the filter driver continuing the following processing of the corresponding event in conformity with the determination of the security process.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
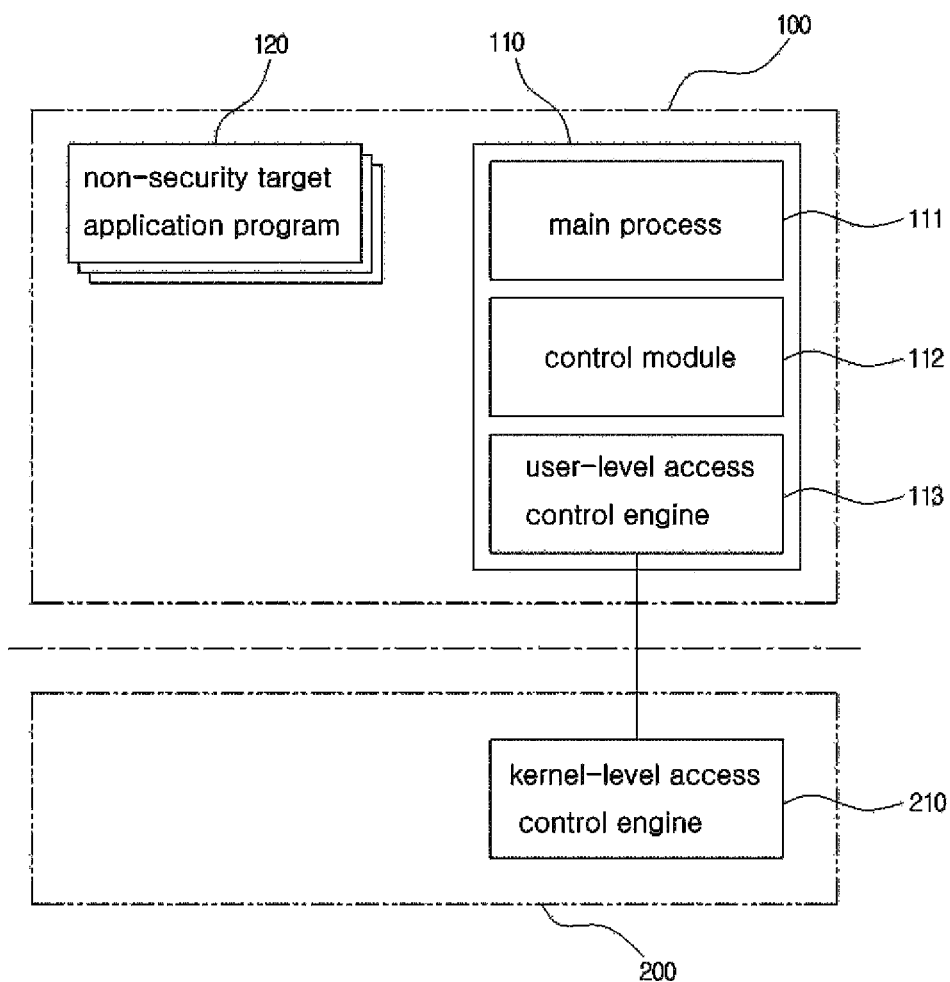
FIG. 1 is a block diagram schematically showing the process handling of a conventional security program.

Reference now should be made to the drawings, in which the same reference numerals are used throughout the different drawings to designate the same or similar components.

The present invention will be described in detail below with reference to the accompanying drawings.

Figure 2:
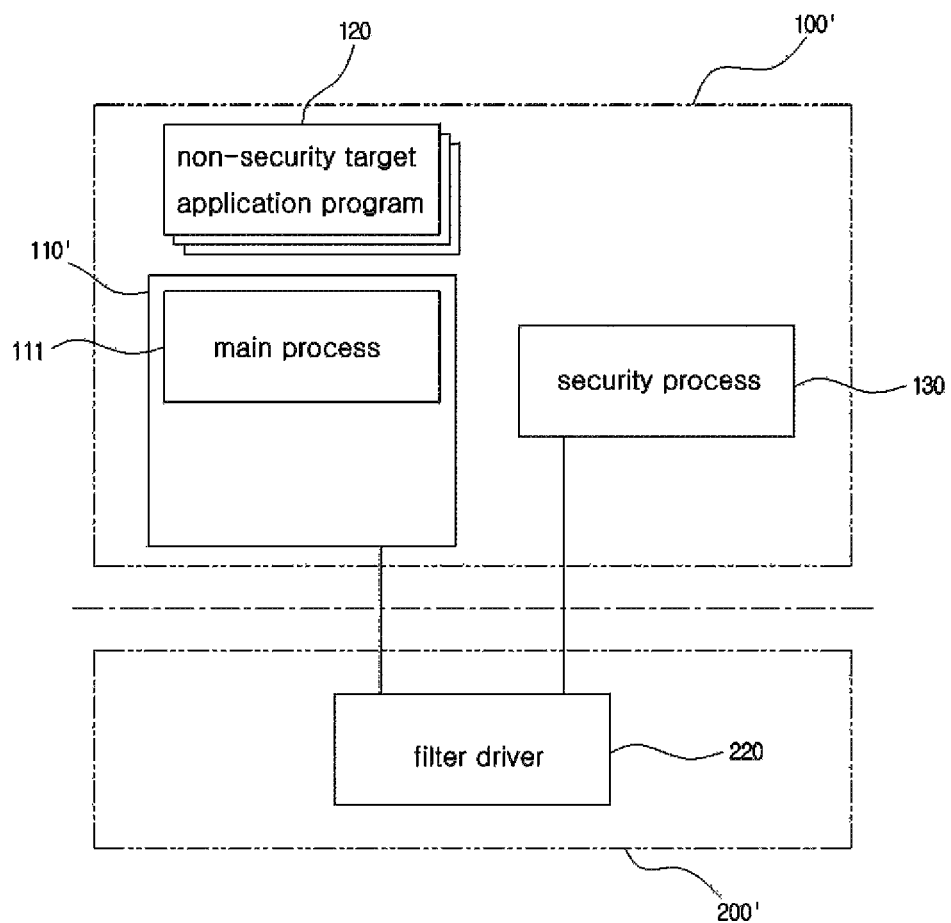
FIG. 2 is a block diagram schematically showing the process handling of a security program according to the present invention.

FIG. 2 is a block diagram schematically showing the process handling of a security program according to the present invention. The following description will be given with reference to this drawing.

In a security system according to the present invention, at a user level 100', a security target application program 110' and a non-security target application program 120 are installed and a security process 130 for controlling processing is additionally installed based on security control policies for data processing. That is, the security process 130 is a process that runs independently of the security target application program 110' and the non-security target application program 120.

Meanwhile, at a kernel level 200', a filter driver 220 for processing corresponding data under the control of the security process 130 is installed. Here, the filter driver 220 checks processing that will be performed by the main process 111 of the security target application program 110', makes a query to the security process 130, and performs the following processing under the control of the security process 130. A more detailed description thereof will be given in conjunction with a security method according to an embodiment of the present invention.

Figure 3:
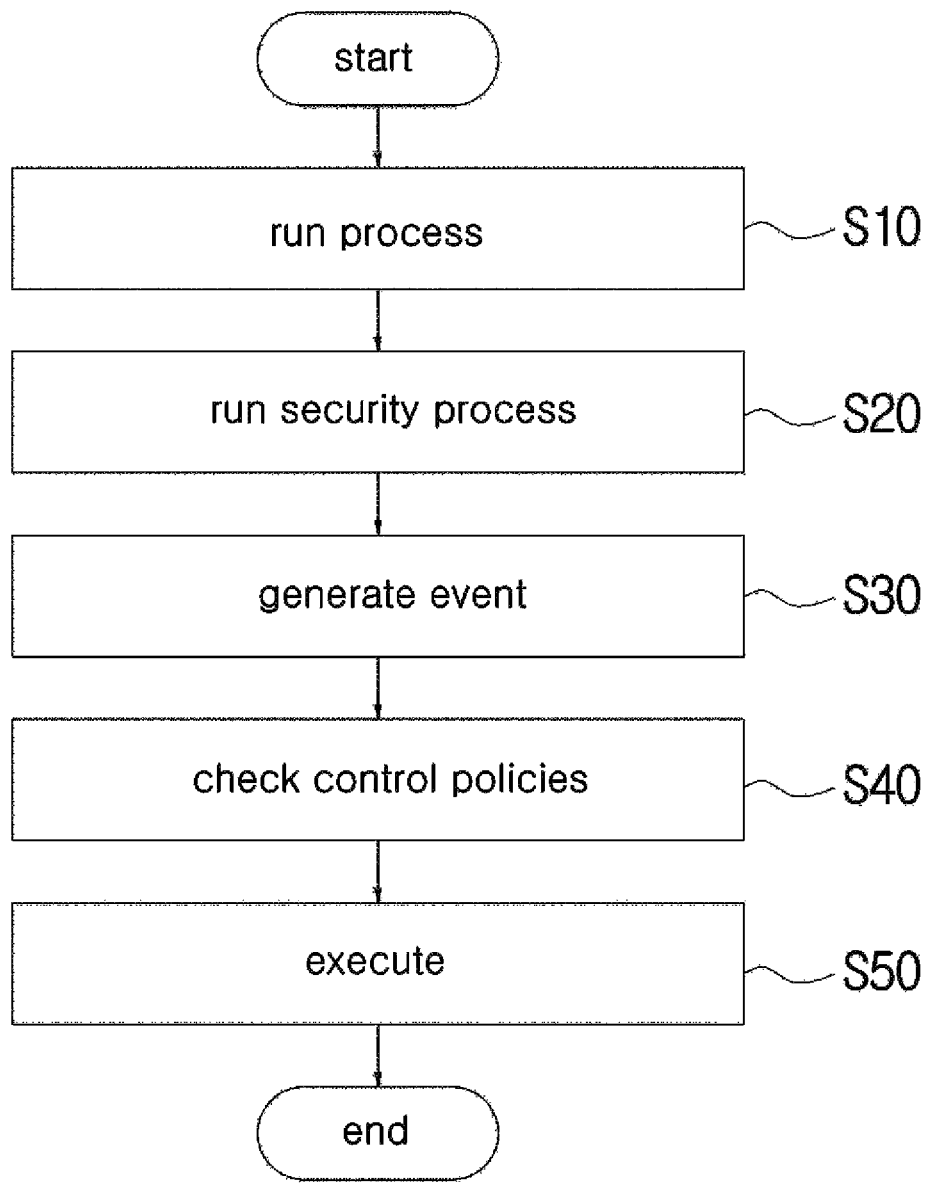
FIG. 3 is a flowchart sequentially showing the process of a method for the security of application programs according to the present invention.

FIG. 3 is a flowchart showing the process of an application program security method according to the present invention. The following description will be given with reference to this drawing.

S10; Process Running Step

Once a user selects an application program 110' or 120 to be executed using common input means (not shown), the main process 111 of the application program 110' or 120 is run and then executes the corresponding application program 110' or 120.

For reference, since the process and method of executing the application program 110' or 120, which is performed by the explorer of an operating system (OS; not shown), are technologies which are widely known and used, detailed descriptions thereof will be omitted here.

Thereafter, if the corresponding application program 110' or 120 is the security target application program 110', it can be determined whether the main process 111 of the security target application program 110' is running. There are various means for determining whether the main process 111 is running, and these include a method of checking the application program of a final execution path by checking the execution path of an API function (Createprocess, Createfile, or the like) which is processed by the process (not shown) of an explorer and a method of checking the type of process which is running when an application program is executed.

S20; Security Process Running Step

If it is determined that the security target application program 110' is running, the security process 130 is executed. The security process 130 is running in compliance with security control policies that limit the criteria for the identification of the security target application program 110' and the criteria for the execution of data processing, and, at the same time, protects not only data that are processed by the security target application program 110' but also data that are processed by the non-security target application program 120. That is, based on a user's selection, only data which is processed by the security target application program 110' may be protected, or all of the data which are processed by a corresponding computer may be protected regardless of whether an application program in question is a security target application program.

S30; Event Generation Step

A user may perform the execution, editing, storage or deletion of data (hereinafter an "event") by manipulating a currently running (non-)security target application program 110' or 120. The event input by the user is performed in such a manner that the main process 110 of the corresponding non-security target application program 110' or 120 processes a related function. Here, the filter driver 220 at the kernel level 200' hooks the function, so that information about the event can be checked, and the performance of the following processing is stopped and then the following processing is performed depending on the determination of the security process 130.

S40; Control Policy Checking Step

In order to perform the following processing of the event, the filter driver 220 notifies the security process 130 of the occurrence of the event, and also transfers event information regarding the type of event, the type of corresponding application program, the location of the occurrence of the event, etc.

The security process 130 checks the event information, searches for a corresponding security control policy, and determines whether the following processing of the event can be performed. That is, since the security process 130 can concentrate security control policies, which will be applied to both the user level 100' and the kernel level 200', on a single security process, the security control policies only need to be produced in format which is suitable for the security process 130, with the result that an administrator can significantly easily perform the production and update of security control policies which are performed to manage a security program.

Thereafter, the security process 130 may store various security control policies in the form of a DLL, and transfers the determination of whether the following processing can be performed, which was made based on the comparison between the event information and the corresponding security control policy, to the filter driver 220.

S50; Execution Step

When the decision of the security process 130 is transferred to the filter driver 220, the filter driver 220 performs the stopped following processing of the event according to the decision.

As a result, if the determination is related to the stopping of the following processing, corresponding processing is the stopping of the processing of the corresponding function. In contrast, if the determination is related to the continuation of the following processing, the corresponding process is the continuation of the processing of the corresponding function.

Accordingly, the security system according to the present invention can stably maintain data security using only security control policies set in the security process 130 to achieve the security of data, and can reduce efforts to perform the production and update of the security control policies which are performed to manage and update a security program.

Figure 4:
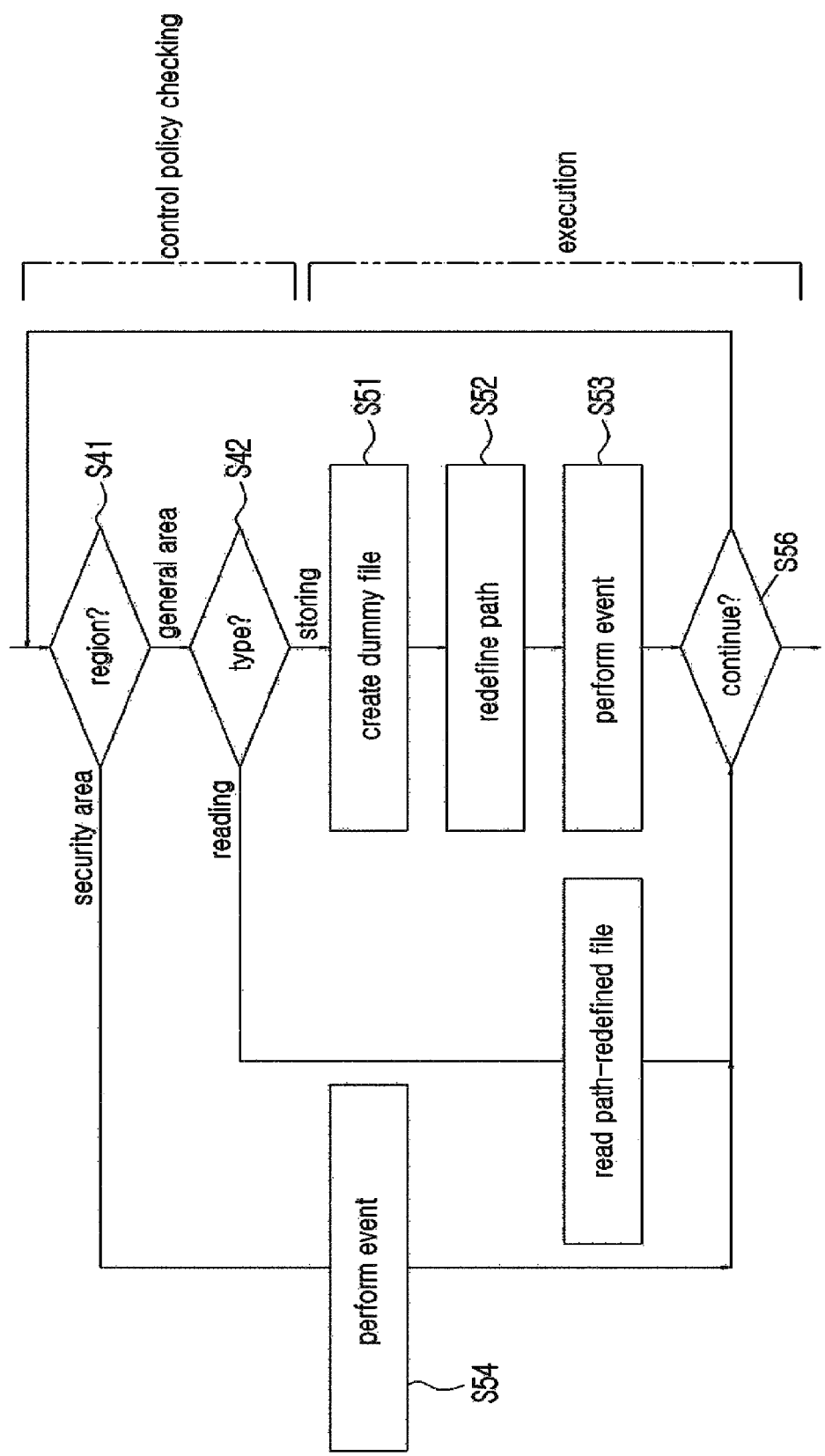
FIG. 4 is a flowchart sequentially showing the control policy checking and execution process of the method for the security of application programs according to the present invention.

FIG. 4 is a flowchart sequentially showing the control policy checking and execution process of the method for the security of application programs according to the present invention.

S41; Area Checking Step

Under the security control policies according to the present invention, a security area separate from a general area is set in a corresponding computer, and the processing of the event of data is performed on each of the areas.

That is, if drive C, which is an unsecured general area, is present in a computer and a security program is installed in the computer, independent drive D, different from drive C, is created and drive D is a security area, so that the target data of an event that occurs in drive D can be protected. Although the security area according to the present invention drive may be separated on a drive basis, it may be separated on a folder basis. That is, the security area may be any space as long as the space can be used to store and manage data (a file(s)). In the following description, drive C is representative of a general area, and drive D is representative of a security area.

At area checking step S41, the security process 130 determines whether the location of a data (file) executed by the (non-)security target application program 110' or 120 is drive C or drive D by checking the event information transferred by the filter driver 220. That is, it is determined whether the location of a data (file) being executed is a general area or a security area.

If it is determined that the corresponding event of the event information is being performed in drive D, that is, a security area, the security process 130 transfers a determination indicative of the continuation of all the processing (reading, and storing) of the corresponding event to the filter driver 220, and the filter driver 220 continues the following processing of the corresponding event according to the determination at event processing step S53.

In contrast, if it is determined that the corresponding event of the event information is being performed on drive C, that is, a general area, the security process 130 performs the subsequent step of checking the type of event.

S42; Event Type Checking Step

If it is determined that the area in which the event is being performed is a general area at area checking step S41, it is determined whether the type of event is reading or storing. Here, reading is representative of reading and outputting data, while storing is representative of writing, editing and storing data.

If data (a file) being executed by the (non-)security target application program 110' or 120 is a file which is present and is read and executed and the corresponding event information is determined to be reading data (file) at step S42, a file, the path of which was redefined, is searched for and is then opened at path-redefined file opening step S55. A further detailed description of the path redefinition will be given below.

Thereafter, if data (file) being executed by the (non-)security target application program 110' or 120 was newly created and the type of event is storing the data (file) in the general area of the computer, the security process 130 performs the subsequent step of creating dummy information.

S51; Dummy File Creation Step

According to the security method of the present invention, although a corresponding event is performed in a general area, the security system performs the event in a security area and a user considers that the event being performed by him or her is being performed in the general area.

For this purpose, the security process 130 transfers a determination which directs the filter driver 220 to create a dummy file instead of the corresponding data (file), and the filter driver 220 creates a dummy file in conformity with the determination and then stores the dummy file at a corresponding location of the general area designed by the user. For example, when a user writes a document using MS Word, that is, the (non-)security target application program 110' or 120, and attempts to store it in folder A of drive C using the file name "a.doc," the filter driver 220 creates a dummy file having the file name "a.doc" identical to the file name of the former file name, then stores the dummy file in folder A of drive C designated by the user. As a result, the path of the dummy file is "C:\A\a.doc."

S52; Path Redefinition Step

Thereafter, the filter driver 220 stores file a.doc, that is, an original file created by the user, in drive D, that is, a security area. In greater detail, the filter driver 220 also creates folder A, created by the user, in drive D, and designates a search path so that original file a.doc is stored in folder A of drive D.

Here, the dummy file of the original data (file) contains only data about the file name and information about a link to the original data (file), but does not contain actual data at all.

For reference, in order to effectively manage the original data (file), stored by the path redefinition of the filter driver 220, in drive D, that is, a security area, it may be possible to create a drive C folder at a lower-level directory under drive D, to create folder A, that is, a lower-level directory under drive C, and to then store the original data (file) therein. Accordingly, the redefined path of the original data (file) is D:\C\A\a.doc.

As a result, the original data (file) of a document created using the (non-)security target application program is stored only in drive D (a security area) regardless of the location where the user attempts to store the file.

S53; Event Performance Step

Once the creation of the original data (file) and the dummy file and the path designation have been completed, the filter driver 220 performs processing so that information input by the user is stored in the original data (file), other than the dummy file. It may be determined whether the user will continue the processing of the event at step 556, and the control policy checking step S40 and the execution step S50 may be repeated.

For reference, at event type checking step S42, the user may attempt to read the dummy file in the general area. When this event occurs, the filter driver 220 transfers corresponding event information to the security process 130, and the security process 130 checks the event information and then transfers a determination which directs the filter driver 220 to read the original data (file) of the dummy file instead of the dummy file. The filter driver 220 reads and executes the original data (file) based on the redefined path.

If the filter driver 220 does not operate normally, it is impossible to read the original data (file) based on the redefined path. Furthermore, when drive D (a security area) is made not to operate depending on the status of the filter driver 220, access to data (file) in the security area is fundamentally impossible and the file can be prevented from being illegitimately removed.

Furthermore, the user may change the location of a dummy file in a general area. In greater detail, the filter driver 220 detects such an event and transfers corresponding event information to the security process 130, and the security process 130 transfers the determination directing the original data (file) of the corresponding dummy file to be also changed to the filter driver 220 if the event information indicates that the event complies with the security control policies.

As an example, when the user attempts to perform the event of moving file a.doc, stored in folder A of drive C, that is, a general area, to folder B, the filter driver 220 changes the path of the corresponding dummy file from C:\A\a.doc to C:\B\a.doc in conformity with the determination of the security process 130 and may also change the path of the original data (file) of the dummy file from D:\C\A\a.doc to D:\C\B\a.doc.

Alternatively, the security process 130 may store path redefinition information in memory, and the filter drive 220 may not generate a dummy file in a general area, but process an event based on the path redefinition information stored in the memory.

The present invention configured as described above is advantageous in that the security process can manage security control policies for application programs or data, executed at user and kernel levels, in an integrated manner, so that the format and execution paths for the security control policies can be easily constructed and managed, and events regarding data are processed in the security area of a computer in an integrated manner and also a user can easily process data without distinguishing between general and security areas, thereby fundamentally preventing data from leaking to the outside due to a mistake or intention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for security of file input and output of application programs, comprising:
    a security process running step of executing an application program and an security process independent of a main process of the application program, wherein the security process is connected to a filter driver to control the filter driver;
    an event generation step of the filter driver checking an event being processed by the application program, stopping processing of the event and transferring event information regarding the event to the security process;
    a control policy checking step of the security process comparing the event information with a corresponding security control policy and transferring determination of the comparison to the filter driver; and
    an execution step of the filter driver continuing following processing of the corresponding event in conformity with the determination of the security process;
    wherein a storage space of a computer in which the security process and the filter driver are installed is divided into a security area and a general area, the storage space being a space where data (a file) is executed;
    wherein the control policy checking step comprises:
    an area checking step of determining whether an area where the event being processed by the application program is being performed is the security or general area, and, if it is determined that the corresponding area is the security area, the security process transferring determination indicative of continuation of processing of the event to the filter driver; and
        an event type checking step of, if it is determined that the corresponding area is the general area at the area checking step, the security process determining whether the type of event is storing data (a file) or reading data (a file), and transferring determination indicative of creation of a dummy file and redefinition of a path of original data (a file) to the filter driver if it is determined that the type of event is storing data; and wherein the execution step comprises:

a dummy file creation step of the filter driver receiving the determination indicative of creation of a dummy file and creating the corresponding dummy file in the general area designed by a user;

a path redefinition step of the filter driver receiving the determination indicative of the redefinition of the path, redefining the path of the original data (file) as the security area and storing the path; and an event processing step of the filter driver receiving the determination indicative of continuation of processing of the event, and performing the corresponding event of the application program on the original data (file), the path of which was redefined as the security area, in order to continue following processing of the event.

2. The method as set forth in claim 1, wherein:

the event checking step comprises a step of, if a type of the event is reading data (a file), the security process transferring determination indicative of searching for original data (a file) of the data (the file) stored in the security area to the filter driver; and the execution step comprises a path-redefined file reading step of the filter driver searching the security area for the original data (file), a path of which was redefined, and executing the original data (file).

* * * * *